United States Patent
Sinha

(10) Patent No.: US 11,465,354 B2
(45) Date of Patent: Oct. 11, 2022

(54) FABRICATION OF ADDITIVE MANUFACTURING PARTS

(71) Applicant: The Boeing Company, Chicago, IL (US)

(72) Inventor: Nishant Kumar Sinha, Karnataka (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/734,497

(22) Filed: Jan. 6, 2020

(65) Prior Publication Data
US 2021/0206089 A1     Jul. 8, 2021

(51) Int. Cl.
| | |
|---|---|
| *B29C 64/336* | (2017.01) |
| *B29C 64/209* | (2017.01) |
| *B29C 64/118* | (2017.01) |
| *B29C 64/188* | (2017.01) |

(Continued)

(52) U.S. Cl.
CPC .......... *B29C 64/336* (2017.08); *B29C 64/118* (2017.08); *B29C 64/188* (2017.08);
(Continued)

(58) Field of Classification Search
CPC ..... B33Y 10/00; H01L 24/76; H01L 21/4846; H01L 21/486; H01L 2224/24225;
(Continued)

(56) References Cited

U.S. PATENT DOCUMENTS

| | | | | |
|---|---|---|---|---|
| 5,121,329 A | * | 6/1992 | Crump | B33Y 40/00 700/119 |
| 6,698,089 B2 | * | 3/2004 | Finn | G06K 19/077 29/748 |

(Continued)

OTHER PUBLICATIONS

Sithiprumnea D., "Filaments Production and Fused Deposition Modelling of ABS/Carbon Nanotubes Composites", Nanomaterials, Jan. 2018, 8(1): 49.

(Continued)

*Primary Examiner* — Manley L Cummins, IV
(74) *Attorney, Agent, or Firm* — Ostrager Chong Flaherty & Broitman P.C.

(57) ABSTRACT

Additive manufacturing parts having improved functional properties such as conductivity and absorption are fabricated with a fused filament fabrication process to have a contiguous path of functional nanomaterial embedded within the parts. A first heated filament consisting of a primary polymer material is deposited through a first nozzle and a second heated filament including a secondary polymer material filled with functional nanomaterial is deposited through a second nozzle in one or more layers to form a fabricated additive manufacturing part having at least one void. The second heated filament is embedded within the primary polymer material. A section of the fabricated additive manufacturing part where the secondary polymer material is located is selectively melted and an external isostatic pressure is applied to the fabricated additive manufacturing part to diffuse the secondary polymer material into the void and form a contiguous path of functional nanomaterial within the additive manufacturing parts.

26 Claims, 5 Drawing Sheets

(51) Int. Cl.
  *B29C 64/264* (2017.01)
  *B33Y 80/00* (2015.01)
  *B33Y 10/00* (2015.01)
  *B33Y 40/20* (2020.01)
(52) U.S. Cl.
  CPC .......... *B29C 64/209* (2017.08); *B29C 64/264* (2017.08); *B33Y 10/00* (2014.12); *B33Y 40/20* (2020.01); *B33Y 80/00* (2014.12)
(58) Field of Classification Search
  CPC . H01L 2224/32225; H01L 2224/73267; H01L 2224/7525; H01L 2224/75264; H01L 2224/7528; H01L 24/24; H01L 24/32; H01L 24/73; H01L 24/75; H01L 24/82; H01L 2924/14; H01L 2924/1434; H01L 2924/1461; H01L 2924/15153; H01L 2924/157; H01L 2924/1579; B29C 64/118; B29C 64/188; B29C 64/209; B29C 64/264; B29C 64/336; H05K 1/183; H05K 1/186; H05K 3/4664
  See application file for complete search history.

(56) References Cited

U.S. PATENT DOCUMENTS

| | | | | |
|---|---|---|---|---|
| 2004/0145629 A1* | 7/2004 | Silverbrook | ........... | B33Y 50/02 347/40 |
| 2009/0177309 A1* | 7/2009 | Kozlak | ................. | B29C 64/321 700/119 |
| 2013/0170171 A1* | 7/2013 | Wicker | ................ | H01L 21/4846 361/809 |
| 2013/0303002 A1* | 11/2013 | Oosterhuis | ............. | H01R 12/71 439/49 |
| 2014/0192498 A1* | 7/2014 | Rathburn | .......... | H01L 23/49827 361/767 |
| 2015/0360427 A1* | 12/2015 | Shah | .................... | B29C 64/106 264/489 |
| 2016/0089720 A1* | 3/2016 | Kamakura | .............. | B22F 12/00 419/53 |
| 2016/0198576 A1* | 7/2016 | Lewis | ................... | H01L 25/065 361/761 |
| 2016/0263823 A1* | 9/2016 | Espiau | .................. | H01Q 17/00 |
| 2016/0325491 A1* | 11/2016 | Sweeney | ............... | B29C 64/264 |
| 2018/0050486 A1* | 2/2018 | Talgorn | .................. | B33Y 30/00 |
| 2018/0086924 A1* | 3/2018 | Beers | .................... | B29C 64/165 |
| 2018/0154573 A1* | 6/2018 | Miles | .................. | H05K 3/1283 |
| 2019/0168445 A1* | 6/2019 | Jara Rodelgo | .......... | H01L 41/29 |
| 2020/0180222 A1* | 6/2020 | Suzuki | ................. | B29C 64/295 |

OTHER PUBLICATIONS

Stevenson, Kerry, "Essentium Develops Revolutionary 3D Printing Process", published Jan. 9, 2017 at https://www.fabbaloo.com/blog/2017/1/9/essentium-develops-revolutionary-3d-printing-process.

Terran Data Corporation, "Fabbaloo 3D Printing News", printed Sep. 27, 2019 from https://www.fabbaloo.com/faqs.

* cited by examiner

FABRICATION OF ADDITIVE MANUFACTURING PARTS

TECHNICAL FIELD

This disclosure relates generally to methods for fabricating additive manufacturing materials and more particularly to methods for making additive manufacturing parts with contiguous paths of nanomaterial embedded therein.

BACKGROUND

Additive manufacturing is a process where a part is formed by depositing material (such as liquid resin, powders, or thermoplastic materials) layer by layer on a surface and joining the layers together by heat or other means. One type of additive manufacturing is three-dimensional (or 3D) printing of fused filaments. Generally, when 3D printing fused filaments, a digital 3D image of a part is created using a computer aided design (CAD) program on a computer. Software associated with a 3D printer analyzes and divides the digital 3D image into horizontal layers. Thermoplastic filaments are fed through a heated extruder nozzle, moved around the shape of the part, and deposited onto a surface of the 3D printer to form horizontal layers of the digital 3D image in succession, one layer on top of the other until the part is formed.

It has been found that using nanocomposite materials for specific types of additive manufacturing can enhance various properties of 3D printed parts. For example, filaments formed by dispersing conductive nanoparticles in a polymer matrix have been used to produce functionally active thermoplastic 3D printed parts with enhanced properties for various applications such as electronic sensors (e.g., conductivity and absorption). In current methods of making functionally active thermoplastic 3D printed parts with filaments, nanoparticles are uniformly mixed with the polymer matrix and, when extruded and deposited during the print, the nanoparticles are distributed throughout the polymer matrix in a non-contiguous manner due to the presence of the polymer phase, often leading to agglomeration of the nanoparticles as well as separation of nanoparticles by the polymer. This non-contiguous arrangement of nanoparticles leads to decreased thermal and electrical conductivity performance or physical absorption behavior depending on the type of nanoparticles used.

BRIEF DESCRIPTION

The subject matter disclosed in some detail below is directed to methods of making additive manufacturing parts, with a fused filament fabrication process, such as a 3D printer, that have improved thermal and electrical conductivity performance and/or improved physical absorption behavior and/or other improved functional properties depending on the materials used. In a first aspect of the disclosed method, a first heated filament consisting of a primary polymer material is deposited through a first nozzle and a second heated filament comprising a secondary polymer material filled with functional nanomaterial is deposited through a second nozzle in one or more layers to form a fabricated additive manufacturing part having the primary polymer material and the secondary polymer material arranged according to a digital 3D image design. The fabricated additive manufacturing part has at least one void, gap, or empty space within the primary polymer material that is formed as a result of the fused filament fabrication process or that may be designated as part of the digital 3D image design. The secondary polymer material filled with functional nanomaterial is embedded within the primary polymer material in the fabricated additive manufacturing part.

After the fabricated additive manufacturing part is formed according to the digital 3D image design, the part is subjected to electromagnetic radiation from a microwave source or other types of heating to selectively melt a section of the fabricated additive manufacturing part where the secondary polymer material is located. Selective heating permits the secondary polymer material to disperse and diffuse into the at least one void in the primary polymer material. Isostatic pressure, or other types of external pressure, is externally applied to the selectively heated fabricated additive manufacturing part to enhance the diffusion of the secondary polymer material into the at least one void in the primary polymer material and to permit the functional nanomaterial to align themselves and form a contiguous path or a contiguous nanomaterial structure within the primary polymer material, thus providing a higher density of nanomaterial within the fabricated additive manufacturing part. The steps of heating and applying pressure to the fabricated additive manufacturing part may be done at the same time or may be done successively with the heating done first and then the application of pressure.

To ensure that only the secondary polymer material diffuses into the at least one void in the primary polymer material (and not the functional nanomaterial), the functional nanomaterial preferably has a first density that is at least 10% larger than a second density of the secondary polymer material and/or it has a first length that is larger than 100 microns. The at least one void in the primary polymer material has a second length that is less than 100 microns, thus the larger functional nanomaterial cannot enter the at least one void. The method may employ both of the foregoing structural parameters or either one of these parameters to ensure that the functional nanomaterial does not diffuse into the at least one void.

In the method, the primary polymer material and the secondary polymer material can comprise the same polymer or the polymers in the primary polymer material and the secondary polymer material can be different. If they are different, the secondary polymer material comprises a microwave active polymer and a first solubility parameter of the primary polymer material is within 10 $(J/cm^3)^{0.5}$ of a second solubility parameter of the secondary polymer material.

In another aspect of the disclosure, a method is provided for embedding a contiguous path of nanomaterial in an additive manufacturing part. In this method, a fabricated additive manufacturing part is formed having at least one void by depositing one or more layers of a first heated filament consisting of a primary polymer material through a first nozzle and depositing one or more layers of a second heated filament comprising a secondary polymer material filled with functional nanomaterial through a second nozzle such that the secondary polymer material is embedded within the primary polymer material. After the fabricated additive manufacturing part is formed, the part is subjected to, as described above, electromagnetic radiation from a microwave source or other types of heating to selectively melt a section of the fabricated additive manufacturing part where the secondary polymer material is located and to isostatic pressure, or other types of external pressure, to diffuse the secondary polymer material into the at least one void in the primary polymer material and to permit the functional nanomaterial to align themselves and form a contiguous path or a contiguous nanomaterial structure within the primary polymer material. The steps of heating and applying pressure may be done at the same time or may be done successively with the heating done first and then the application of pressure.

In another aspect of the disclosure, an additive manufacturing part comprises a primary polymer material having at least one void therein, a secondary polymer material diffused into the at least one void, and a contiguous path of functional nanomaterial embedded within the primary polymer material.

The features, functions, and advantages of the method and product that have been discussed, as well as other objects, features, functions, and advantages of the method and product disclosed herein can be achieved independently in various examples of the disclosure or may be combined in other examples further details of which can be seen with reference to the following description and drawings.

BRIEF DESCRIPTION OF THE DRAWINGS

Various implementations of the disclosure will be hereinafter described with reference to drawings for the purpose of illustrating the above-described and other aspects. None of the drawings briefly described in this section are drawn to scale.

Figure 1:
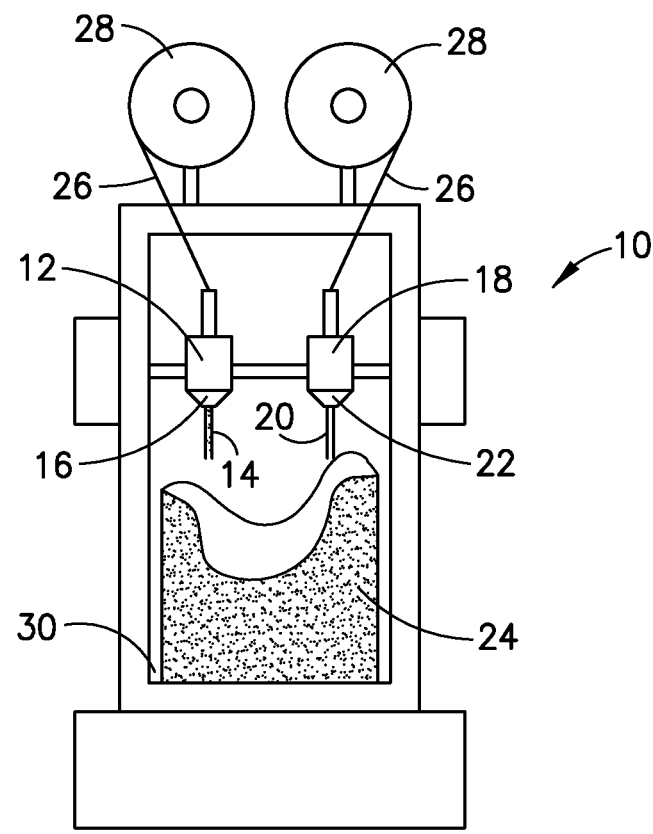
FIG. 1 is an illustration of a 3D printer having dual extruders for forming a fabricated additive manufacturing part in accordance with this disclosure.

Reference will hereinafter be made to the drawings in which similar elements in different drawings bear the same reference numerals. Where reference is made in any one or more of the accompanying drawings to steps and/or features, which have the same reference numerals, those steps and/or features have, for the purposes of this description, the same function(s) or operators(s), unless the contrary intention is apparent.

DETAILED DESCRIPTION

Illustrative implementations of methods of making an additive manufacturing part with a fused filament fabrication process, such as a 3D printer, and of embedding a contiguous path of nanomaterial in an additive manufacturing part, and the resulting additive manufacturing part with improved functional properties are described in some detail below. Not all features of an actual implementation are described in this specification. A person skilled in the art will appreciate that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the following description, the disclosed methods and resulting products are described in the context of parts having improved functional properties of conductivity and absorption, enabling use of the parts in high-performance electronic, mechanical, or gas sensor applications as one non-limiting example of an application of the methods and products. The methods and products can readily be adapted for use in any other type of application that requires functional parts. For example, the methods and products can be used by aerospace, automotive, industrial OEM and equipment, and materials suppliers for filament-based 3D printing technologies to improve functional properties of additive manufacturing parts and reduce manufacturing costs.

FIG. 1 is an illustration of a 3D printer 10 suitable for use with the disclosed methods. The 3D printer 10 has a first extruder 12 for extruding a first heated filament 14 through a first nozzle 16. The 3D printer 10 has a second extruder 18 for extruding a second heated filament 20 through a second nozzle 22. Any commercially available 3D printer or other device that can extrude two filaments with different polymer materials in coordination with each other is suitable for use with the methods disclosed herein. One example of a suitable device is the TENLOG TL-D3 Pro Dual Extruder 3D Printer.

When using a 3D printer or similar device to form a fabricated additive manufacturing part 24, a digital 3D image of the additive manufacturing part 24 is first created using a computer aided design (CAD) program on a computer (not shown). Software, such as Simplify3D, that comes with commercially available 3D printers generates a G-code file for use by the 3D printer 10 that defines a path for the first extruder 12 and the second extruder 18. The software also analyzes the structure of the fabricated additive manufacturing part 24 to be formed and divides the structure into horizontal layers 31 and rows 33 that will be formed by the 3D printer 10 (see FIG. 2).

Figure 2:
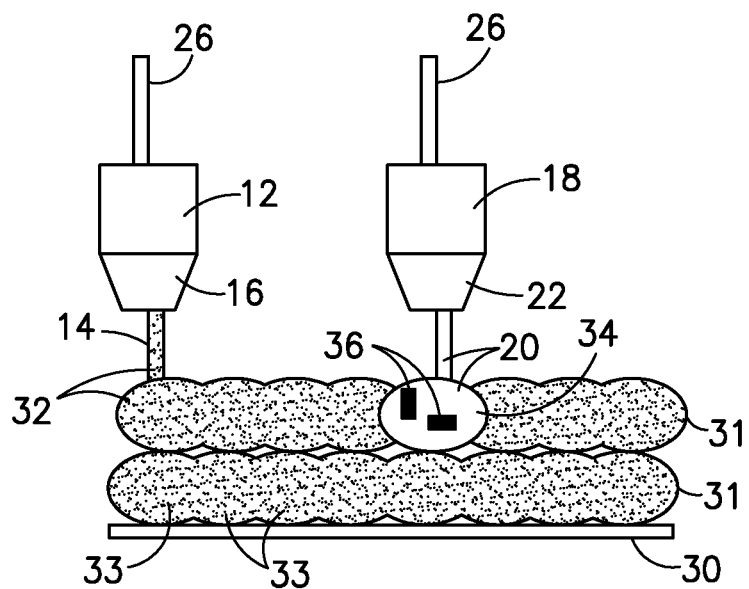
FIG. 2 is an enlarged illustration of dual extruders from a 3D printer and layers of the fabricated additive manufacturing part during a printing stage of the disclosed methods.

Referring to FIGS. 1 and 2, thermoplastic filaments 26 that are wound on reels 28 are fed through the first extruder 12 and first nozzle 16, and the second extruder 18 and the second nozzle 22, and deposited onto a surface 30 of the 3D printer 10 in rows 33 to form the horizontal layers 31 in succession, one layer on top of the other until the additive manufacturing part 24 is formed. The first extruder 12 and the second extruder 18 are moved around according to the structure of the fabricated additive manufacturing part 24 to deposit the first heated filament 14 and the second heated filament 20 along directions and locations pre-determined by the 3D printer software to form the rows 33 and horizontal layers 31. During formation of the fabricated additive manufacturing part 24, the second heated filament 20 is embedded within the horizontal layers 31 and rows 33 of the first heated filament 14.

Referring to FIG. 2, the first heated filament 14 consists of a primary polymer material 32 that forms the basic structure of the fabricated additive manufacturing part 24. There are no fillers or other materials in the first heated filament 14. Examples of the types of polymers and plastics that may be used to form the primary polymer material 32 include acrylonitrile-butadiene-styrene (ABS), polyetheretherketone (PEEK), and other polymers and plastics that have high strength and can operate in high temperature environments.

The second heated filament 20 includes a secondary polymer material 34 filled with functional nanomaterial 36. The functional nanomaterial 36 is a conductive nanoparticle, for example, carbon nanotubes (CNT), carbon fiber (CF), metal particles, metal organic framework (MOF), or graphene, graphene oxide (GO), or reduced graphene oxide (r-GO). Different types of functional nanomaterial 36 will provide different functional properties and therefore will be useful in different applications. For example, CNT and carbon fiber provide thermal and electrical conductivity properties, and MOF provides physical absorption properties. The amount of functional nanomaterial 36 filled into the secondary polymer material 34 depends on the particular application and should be in an amount that enables the secondary polymer material 34 to flow after melting, as hereinafter disclosed.

The primary polymer material 32 and the secondary polymer material 34 may be the same polymer or plastic if the functional nanomaterial 36 is a microwave absorber. Alternatively, the secondary polymer material 34 may be different from the primary polymer material 32. For example, the secondary polymer material 34 can comprise a microwave active polymer, such as polyethylene glycol, if the functional nanomaterial 36 is not a microwave absorber. If the secondary polymer material 34 is not the same as the primary polymer material 32, the two materials must be compatible to avoid phase separation in the fabricated additive manufacturing part 24, i.e., a first solubility parameter of the primary polymer material 32 is within 10 $(J/cm^3)^{0.5}$ of a second solubility parameter of the secondary polymer material 34. For example, Ultem and polyethylene glycol are compatible as they have similar solubility parameters (28 and 24 $(J/cm^3)^{0.5}$, respectively).

Figure 3:
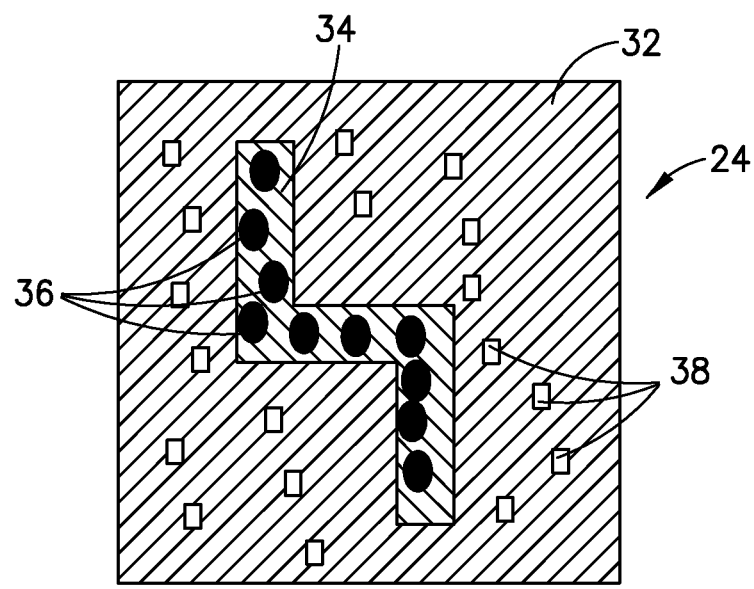
FIG. 3 is a cross-sectional view of a fabricated additive manufacturing part before the application of heat and pressure.

Referring to FIG. 3, a cross-sectional view of the fabricated additive manufacturing part 24, the secondary polymer material 34, including the functional nanomaterial 36, is embedded within the primary polymer material 32. As with known 3D printing processes that fill functional nanomaterial in a polymer filament, when extruded and deposited by the 3D printer 10, the functional nanomaterial 36 in the secondary polymer material 34 are distributed in a non-contiguous manner, i.e., they are separated by the secondary polymer material 34. The fabricated additive manufacturing part 24 also includes at least one void 38 within the primary polymer material 32 that is formed as a result of the 3D printing process or that may be designed as part of the digital 3D image design. As shown in FIG. 3, the at least one void 38 is an empty space or gap within the primary polymer material 32.

Figure 4:
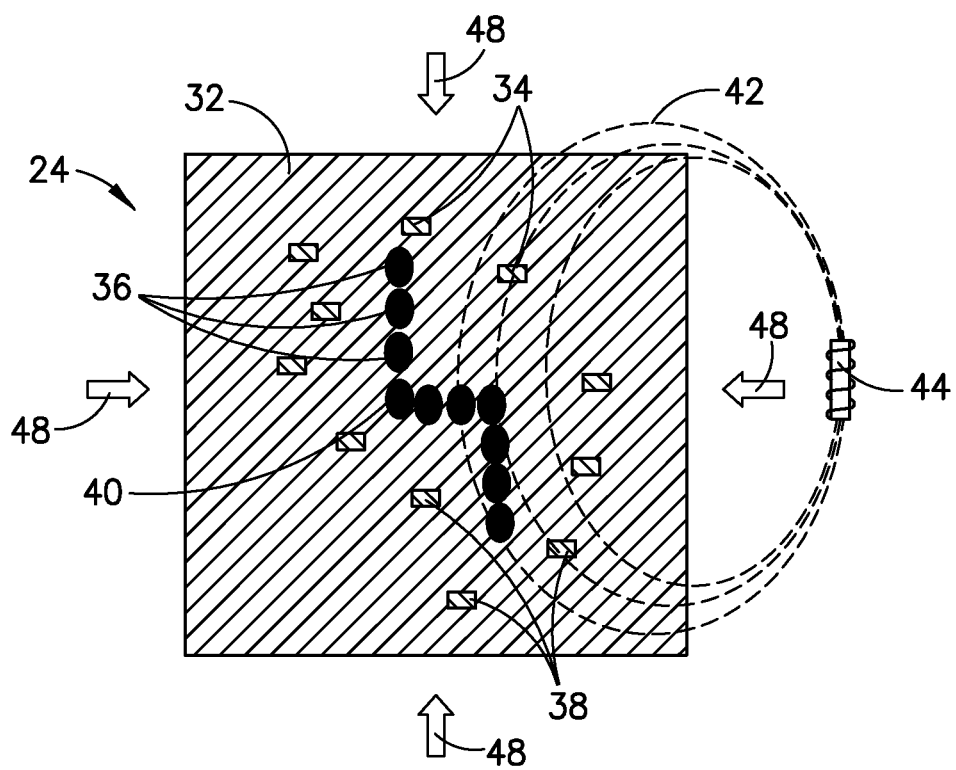
FIG. 4 is a cross-sectional view of the fabricated additive manufacturing part on FIG. 3 after application of heat and pressure.
Figure 5:
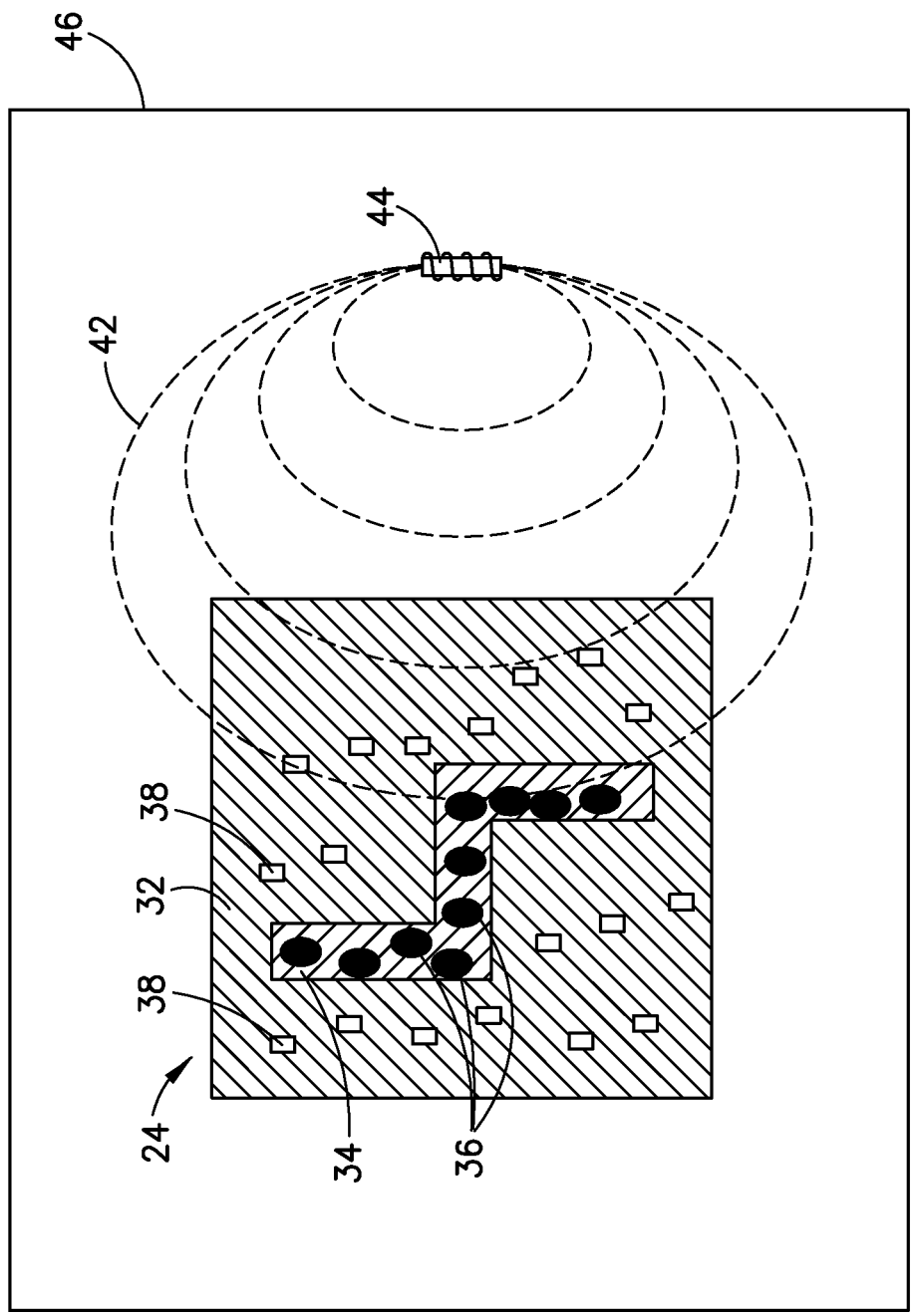
FIG. 5 is an illustration of a heating device for use with the disclosed methods.
Figure 6:
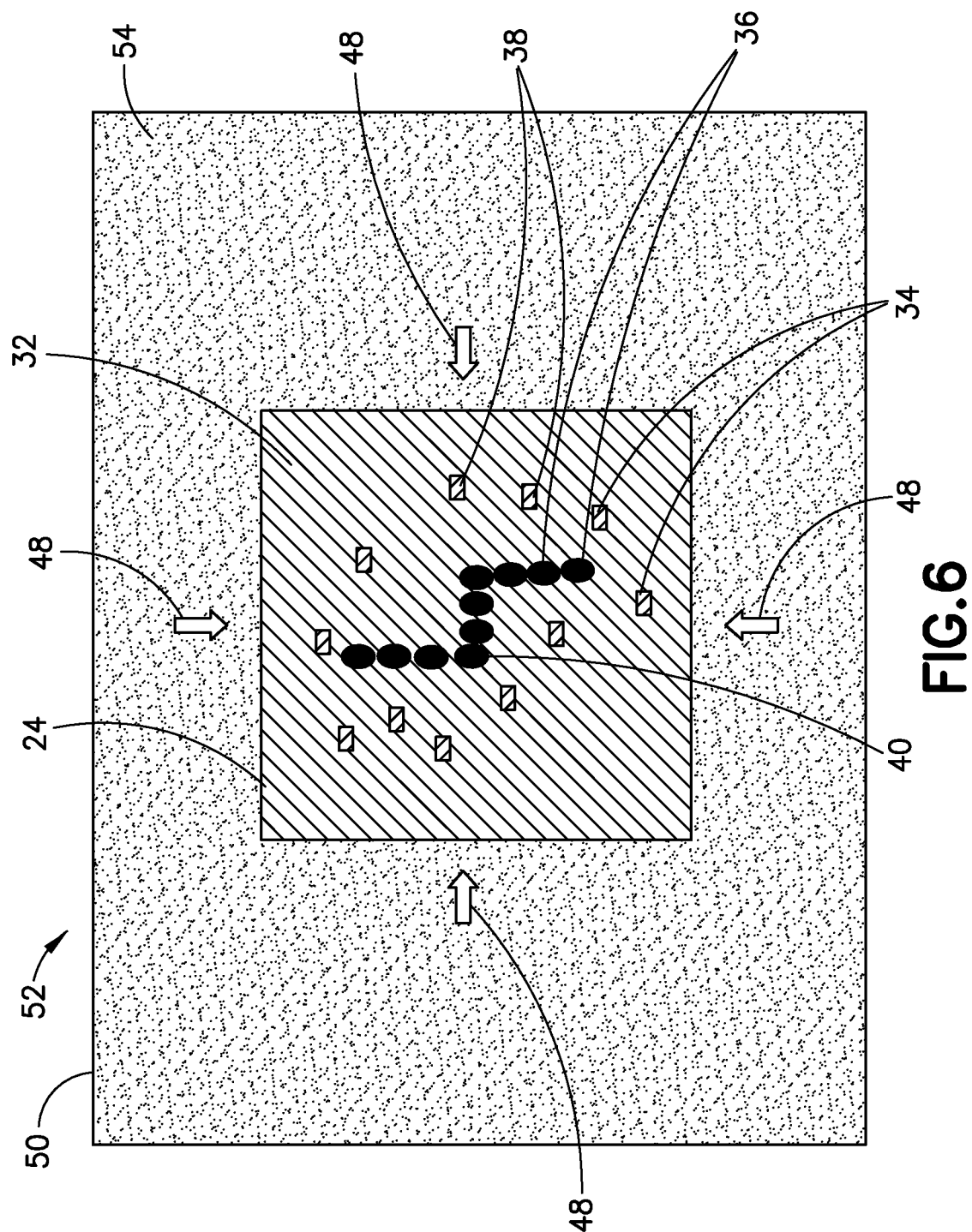
FIG. 6 is an illustration of an isostatic pressure device for use with the disclosed methods.

Referring to FIGS. 4-6, to further improve the functional properties of the fabricated additive manufacturing part 24 (for example, as shown in FIG. 3), the fabricated additive manufacturing part 24 is subjected to one or more post-processing steps that melt and disperse the secondary polymer material 34 into the at least one void 38 in the primary polymer material 32 and align the functional nanomaterial 36 to selectively enhance the density of the functional nanomaterial 36 within the fabricated additive manufacturing part 24 and to form a contiguous path 40 of functional nanomaterial 36 within the fabricated additive manufacturing part, i.e., the functional nanomaterial 36 is connected together, either end-to-end or side-to-side. The post-processing steps include the application of selective heat and pressure to the additive manufacturing part 24, which can be applied at the same time or which can be applied successively in separate steps with the selective heat being applied prior to the pressure.

Heat is applied to the fabricated additive manufacturing part 24 to selectively melt the secondary polymer material 34. The primary polymer material 32 does not melt (i.e., only one phase of the fabricated additive manufacturing part 24 is melted). For example, electromagnetic radiation 42 from a microwave source 44, as shown in FIGS. 4 and 5, may be used to pinpoint where the heat is applied within the fabricated additive manufacturing part 24 to selectively melt the secondary polymer material 34. The microwave source 44 may be provided in any type of heating device 46 that can apply and contain the electromagnetic radiation 42 within the heating device 46, such as a consumer or commercial kitchen microwave. The fabricated additive manufacturing part 24 is removed from the 3D printer 10 and inserted into the heating device 46. The microwave source 44 and electromagnetic radiation 42 in the heating device 46 are tuned to have a frequency range that matches a dielectric loss of the secondary polymer material 34 if the secondary polymer material 34 is different from the primary polymer material 32. For example, polyethylene glycol can be used as the secondary polymer material 34 with the microwave source 44 tuned to a frequency of 2.45 GHz (dielectric loss factor of 1 at 20° C.). The primary polymer material 32 can be Nylon66, for example, and have a much lower loss dielectric factor of 0.001 at the same frequency. If the primary polymer material 32 and the secondary polymer material 34 are the same, then the frequency range of the microwave source 44 and electromagnetic radiation 42 are tuned to the frequency of the functional nanomaterial 36. The type of polymer used as the secondary polymer material 34 will also determine the intensity (or the amount) of the electromagnetic radiation 42 for melting the secondary polymer material 34.

Pressure is applied external to the fabricated additive manufacturing part 24, preferably an external isostatic pressure 48 applied around the sides of the fabricated additive manufacturing part 24 as shown in FIGS. 4 and 6, so the secondary polymer material 34 diffuses into a nearby at least one void 38 in the primary polymer material 32, leaving behind a contiguous path 40 of functional nanomaterial 36 as previously described. The external isostatic pressure 48 is applied in the range of 1-100 atm to enable flow of the secondary polymer material 34 and reduce the chance of damaging the fabricated additive manufacturing part 24. The external isostatic pressure 48 may be applied to the fabricated additive manufacturing part 24 at the same time as the electromagnetic radiation 42 from the microwave source 44 is applied as shown in FIG. 4. Alternatively, the fabricated additive manufacturing part 24 can be removed from the heating device 46 and placed into a chamber 50 of a separate pressure device 52 as shown in FIG. 6. External isostatic pressure 48 is preferably applied equally to the sides of the fabricated additive manufacturing part 24 by filling the chamber 50 of the pressure device with an inert gas 54 such as nitrogen or argon, or combinations thereof, as is known in the art. The chamber 50 may be heated or not heated.

Figure 7:
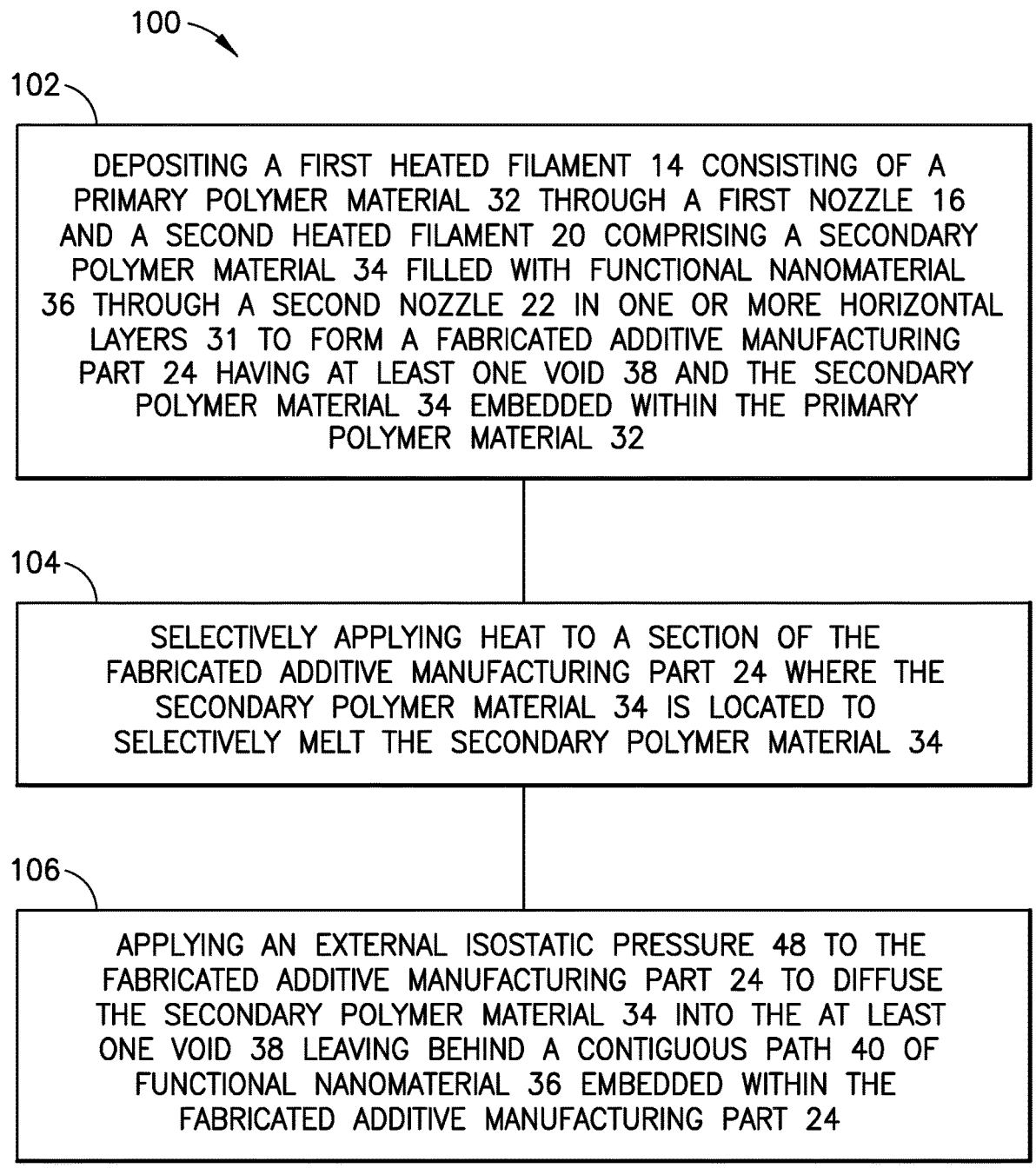
FIG. 7 is a flow chart showing the disclosed methods.

FIG. 7 shows a method 100 of making an additive manufacturing part 24 with a fused filament fabrication process and of embedding a contiguous path of nanomaterial in an additive manufacturing part. In step 102, a first heated filament 14 consisting of a primary polymer material 32 is deposited through a first nozzle 16 and a second heated filament 20 comprising a secondary polymer material 34 filled with functional nanomaterial 36 is deposited through a second nozzle 22 in one or more horizontal layers 31 to form a fabricated additive manufacturing part 24 having at least one void 38 and the secondary polymer material 34 embedded within the primary polymer material 32. In step 104, heat is selectively applied to a section of the fabricated additive manufacturing part 24 where the secondary polymer material 34 is located to selectively melt the secondary polymer material 34. The heating step includes using a microwave source 44 to provide electromagnetic radiation 42 and tuning a frequency range of the electromagnetic radiation 42 to match a dielectric loss factor of the secondary polymer material 34. In step 106, an external isostatic pressure 48 is applied to the fabricated additive manufacturing part 24 to diffuse the secondary polymer material 34 into the at least one void 38 leaving behind a contiguous path 40 of functional nanomaterial 36 embedded within the fabricated additive manufacturing part 24.

The disclosed methods provide a fabricated additive manufacturing part with improved functional properties, enabling its use for high performance sensor applications, and reduced amounts of functional nanomaterial 36 (i.e., a lower loading of filler materials), which makes processing the secondary polymer material 34 in a molten state easier.

Many modifications of the system and method disclosed herein may occur to those skilled in the art upon reading the specification. The present application includes such modifications and is limited only by the scope of the claims. The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method of making an additive manufacturing part with a fused filament fabrication process, the method comprising:
    depositing a first heated filament through a first nozzle and a second heated filament through a second nozzle in one or more layers to form a fabricated additive manufacturing part having at least one void, the first heated filament consisting of a primary polymer material, the second heated filament comprising a secondary polymer material filled with a functional nanomaterial having a first length that is larger than 100 microns, the at least one void having a second length that is less than 100 microns, the secondary polymer material being embedded within the primary polymer material during formation of the fabricated additive manufacturing part.

2. The method of claim 1, further comprising diffusing the embedded secondary polymer material into the at least one void.

3. The method of claim 2, wherein the diffusing step includes:
    selectively melting a section of the fabricated additive manufacturing part where the secondary polymer material is located.

4. The method of claim 3, wherein the selectively melting step comprises applying electromagnetic radiation from a microwave source to the fabricated additive manufacturing part.

5. The method of claim 4, further comprising tuning a frequency range of the electromagnetic radiation to match a dielectric loss factor of the secondary polymer material.

6. The method of claim 3, wherein the diffusing step includes:
    applying an external isostatic pressure to the fabricated additive manufacturing part.

7. The method of claim 6, wherein the functional nanomaterial has a first density that is at least 10% larger than a second density of the secondary polymer material.

8. The method of claim 6, wherein the external isostatic pressure diffuses only the secondary polymer material into the at least one void and the functional nanomaterial forms a contiguous path within the additive manufacturing part.

9. The method of claim 1, wherein the primary polymer material and the secondary polymer material comprise the same polymer.

10. The method of claim 1, wherein the primary polymer material and the secondary polymer material are different, the secondary polymer material comprising a microwave active polymer.

11. The method of claim 10, wherein a first solubility parameter of the primary polymer material is within 10 $(J/cm)^{0.5}$ of a second solubility parameter of the secondary polymer material.

12. A method of embedding a contiguous path of nanomaterial in an additive manufacturing part, the method comprising:
    forming a fabricated additive manufacturing part having at least one void by depositing one or more layers of a first heated filament consisting of a primary polymer material through a first nozzle and depositing one or more layers of a second heated filament comprising a secondary polymer material filled with a functional nanomaterial through a second nozzle such that the secondary polymer material is embedded within the primary polymer material;
    selectively melting a section of the fabricated additive manufacturing part where the secondary polymer material is located; and
    applying an external isostatic pressure to the fabricated additive manufacturing part to diffuse the secondary polymer material into the at least one void.

13. The method of claim 12, wherein the selectively melting step comprises applying electromagnetic radiation from a microwave source to the fabricated additive manufacturing part.

14. The method of claim 12, wherein the functional nanomaterial has a first density that is at least 10% larger than a second density of the secondary polymer material.

15. The method of claim 12, wherein the functional nanomaterial has a first length that is larger than 100 microns and the at least one void has a second length that is less than 100 microns.

16. The method of claim 12, wherein the primary polymer material and the secondary polymer material comprise the same polymer.

17. The method of claim 12, wherein the primary polymer material and the secondary polymer material are different, the secondary polymer material comprising a microwave active polymer.

18. The method of claim 17, wherein a first solubility parameter of the primary polymer material is within 10 $(J/cm^3)^{0.5}$ of a second solubility parameter of the secondary polymer material.

19. The method of claim 12, wherein the external isostatic pressure diffuses only the secondary polymer material into the at least one void and the functional nanomaterial forms a contiguous path within the additive manufacturing part.

20. A method of making an additive manufacturing part with a fused filament fabrication process, the method comprising:
- depositing a first heated filament through a first nozzle and a second heated filament through a second nozzle in one or more layers to form a fabricated additive manufacturing part having at least one void, the first heated filament consisting of a primary polymer material, the second heated filament comprising a secondary polymer material filled with a functional nanomaterial, the secondary polymer material being embedded within the primary polymer material during formation of the fabricated additive manufacturing part; and
- diffusing only the secondary polymer material into the at least one void such that the functional nanomaterial remains within the primary polymer material.

21. The method of claim 20, wherein the diffusing step includes:
- selectively melting a section of the fabricated additive manufacturing part where the secondary polymer material is located.

22. The method of claim 21, wherein the selectively melting step comprises applying electromagnetic radiation from a microwave source to the fabricated additive manufacturing part.

23. The method of claim 22, further comprising tuning a frequency range of the electromagnetic radiation to match a dielectric loss factor of the secondary polymer material.

24. The method of claim 20, wherein the diffusing step includes:
- applying an external isostatic pressure to the fabricated additive manufacturing part.

25. The method of claim 24, wherein the external isostatic pressure diffuses the secondary polymer material into the at least one void and the functional nanomaterial forms a contiguous path within the additive manufacturing part.

26. The method of claim 20, wherein the functional nanomaterial has a first density that is at least 10% larger than a second density of the secondary polymer material.

* * * * *